United States Patent
Gholson et al.

(10) Patent No.: US 12,174,326 B2
(45) Date of Patent: Dec. 24, 2024

(54) ACOUSTIC VECTOR SENSOR

(71) Applicant: Leidos, Inc.

(72) Inventors: Norman Gholson, Gulfport, MS (US); David C. Blain, Biloxi, MS (US)

(73) Assignee: Leidos, Inc., Reston, VA (US)

( * ) Notice: Subject to any disclaimer, the term of this patent is extended or adjusted under 35 U.S.C. 154(b) by 214 days.

(21) Appl. No.: 18/061,033

(22) Filed: Dec. 2, 2022

(65) Prior Publication Data

US 2023/0131772 A1      Apr. 27, 2023

Related U.S. Application Data

(63) Continuation-in-part of application No. 16/847,290, filed on Apr. 13, 2020, now Pat. No. 11,585,954,
(Continued)

(51) Int. Cl.
   *G01V 1/18*      (2006.01)
   *G01H 3/12*      (2006.01)
   (Continued)

(52) U.S. Cl.
   CPC ............. *G01V 1/189* (2013.01); *G01H 3/125* (2013.01); *G01P 5/02* (2013.01); *G01V 1/001* (2013.01); *G01V 1/186* (2013.01); *G01V 1/38* (2013.01)

(58) Field of Classification Search
   CPC ........ G01V 1/189; G01V 1/001; G01V 1/186; G01V 1/38; G01V 1/18; G01V 2210/144;
   (Continued)

(56) References Cited

U.S. PATENT DOCUMENTS

| 4,827,459 A * | 5/1989 | Franklin ............... B06B 1/0655 |
|               |        | 367/158 |
| 6,697,302 B1 * | 2/2004 | Cray ........................ H04R 1/44 |
|               |        | 367/176 |

(Continued)

FOREIGN PATENT DOCUMENTS

RU          2664971 C1 *   8/2018

OTHER PUBLICATIONS

Geospace Technologies, "Geophones GS-11D" [online], Feb. 7, 2012 [retrieved on Sep. 19, 2017], 3 pp., Retrieved from the Internet: http://www.geospace.com/geophones-gs-11d/.
(Continued)

*Primary Examiner* — Daniel Pihulic
(74) *Attorney, Agent, or Firm* — Dawn-Marie Bey; Bey & Cotropia PLLC

(57) ABSTRACT

A horizontal acoustic vector sensor system described herein includes a housing which has a gimbal assembly therein which is attached to a sensor assembly which has multiple pairs of seismometers that arranged orthogonally to one or more neighboring pairs of seismometers, along an approximately horizontal axis. The gimbal assembly with sensor assembly are enclosed within the housing by an endcap which includes an electronics assembly. The multiple pairs of seismometers are wired to the electronics assembly through a slip-ring which allows for movement of the gimbal assembly without entangling the wires. The horizontal acoustic vector sensor system further includes at least one omni-directional hydrophone integrated into the endcap.

19 Claims, 15 Drawing Sheets

Related U.S. Application Data which is a continuation of application No. 15/714,130, filed on Sep. 25, 2017, now Pat. No. 10,649,105.

(60) Provisional application No. 63/285,477, filed on Dec. 2, 2021, provisional application No. 62/403,446, filed on Oct. 3, 2016.

(51) Int. Cl.
*G01P 5/02* (2006.01)
*G01V 1/00* (2024.01)
*G01V 1/38* (2006.01)

(58) Field of Classification Search
CPC ........... G01V 2210/1427; G01H 3/125; G01H 3/005; G01H 3/04; G01P 5/02
See application file for complete search history.

(56) References Cited

U.S. PATENT DOCUMENTS

| | | | | |
|---|---|---|---|---|
| 10,649,105 B1* | 5/2020 | Hamburg | ................ | G01V 1/189 |
| 11,585,954 B2* | 2/2023 | Hamburg | ................ | G01V 1/38 |
| 2006/0272413 A1* | 12/2006 | Vaganov | ................ | G01P 15/18 |
| | | | | 73/514.01 |
| 2012/0057430 A1* | 3/2012 | Rouquette | .............. | G01V 1/201 |
| | | | | 367/24 |
| 2017/0122975 A1* | 5/2017 | Keast | ....................... | G01P 15/09 |
| 2020/0257010 A1* | 8/2020 | Hamburg | ............... | G01H 3/125 |
| 2023/0131772 A1* | 4/2023 | Gholson | ................... | G01P 5/02 |
| | | | | 367/13 |

OTHER PUBLICATIONS

Meggitt, Meggitt Advanced Sensing Technologies, 4 pp.
Wilcoxon Sensing Technologies, "Low-Frequency Vector Sensor VS-301," 2 pp., Aug. 2017.
Wilcoxon Sensing Technologies, "Mid-Frequency Vector Sensor VS-209," 2 pp., Aug. 2017.
Wilcoxon Sensing Technologies, "Low-Frequency Vector Sensor VS-101," 2 pp., Aug. 2017.
Slad, George William, and Merchant, Bion J. SHDAS Production Seismometer Evaluation. United States: 2017. Web. doi:10.2172/1409159.
Merchant, Bion J. SHDAS Production Digitizer Evaluation . . . United States: 2017. Web. doi:10.2172/1373644.

* cited by examiner

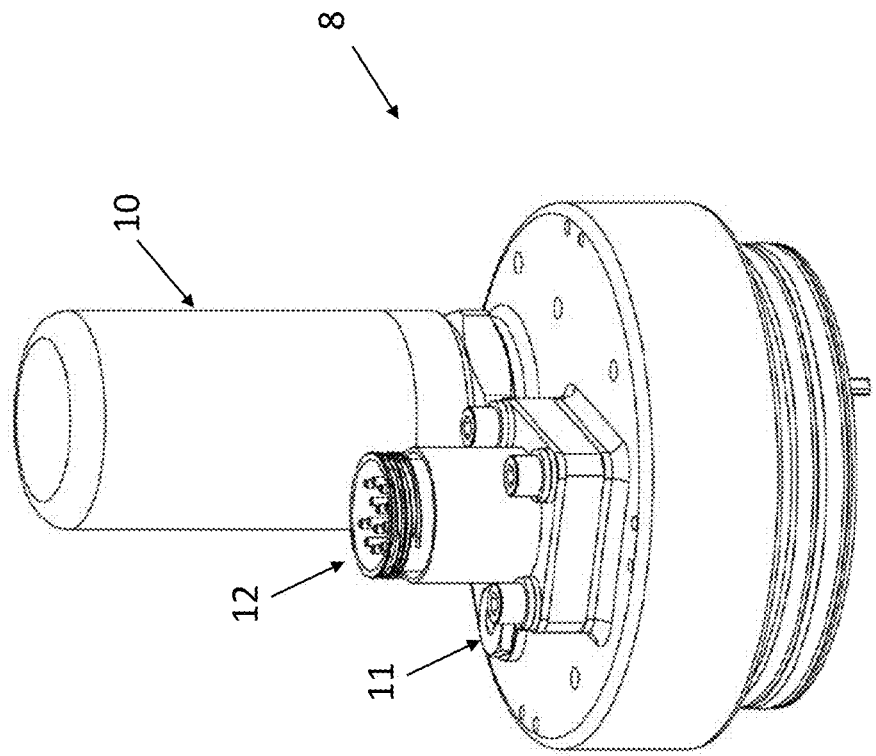
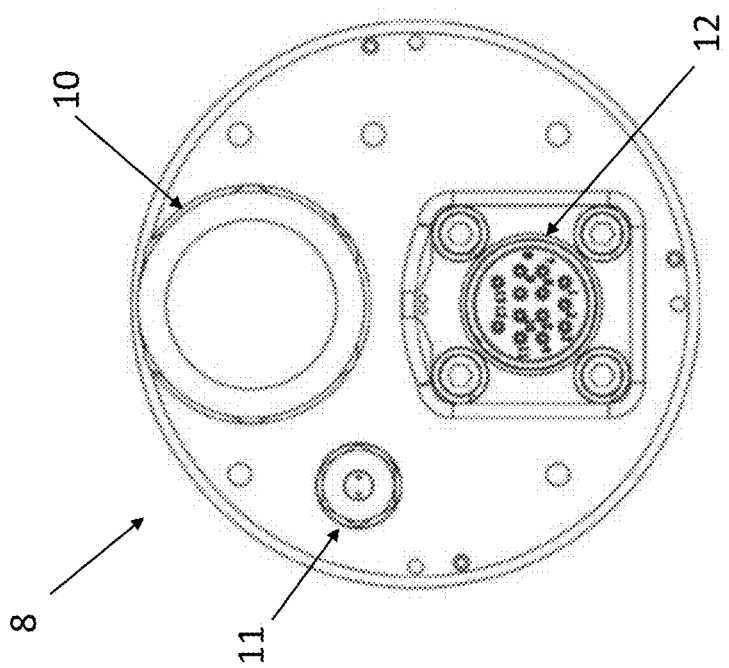

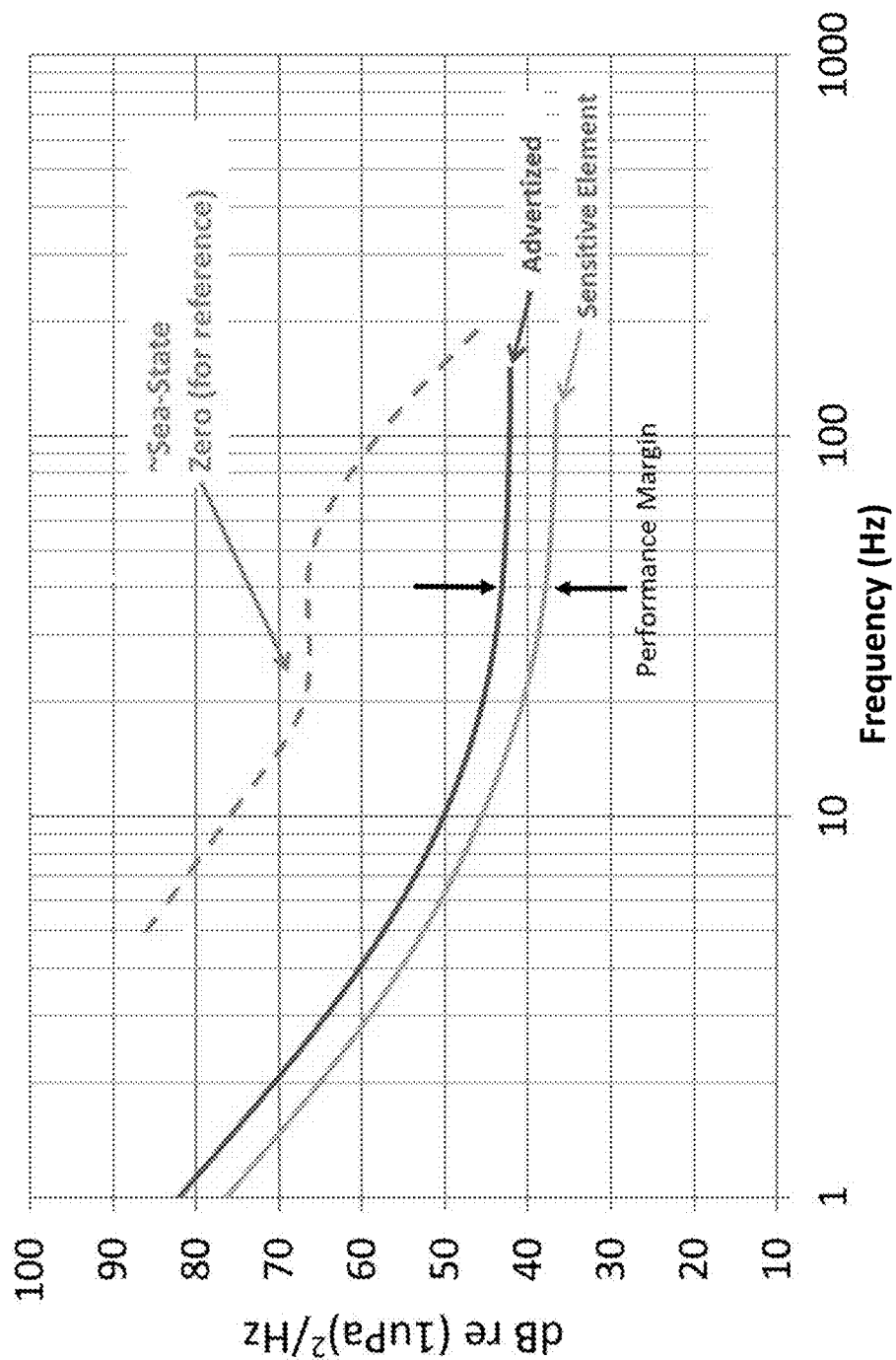

B-B

A-A

ACOUSTIC VECTOR SENSOR

CROSS-REFERENCE TO RELATED APPLICATIONS

The present application claims priority to similarly titled Provisional Patent Application Ser. No. 63/285,477, filed Dec. 2, 2021 and to U.S. patent application Ser. No. 16/847,290, filed Apr. 13, 2020 which claims priority to U.S. patent application Ser. No. 15/714,130, filed Sep. 25, 2017 which claims priority to Provisional Patent Application Ser. No. 62/403,446 filed Oct. 3, 2016, and which are incorporated herein by reference in their entireties.

BACKGROUND OF THE EMBODIMENTS

Field of the Embodiments

Generally, the field of the embodiments is acoustic vector sensors ("AVS").

Description of Related Art

Acoustic vector sensors ("AVS") are gaining popularity in acoustic intelligence and surveillance applications. Sensitivity and directionality at lower frequencies make them ideally suited for many collection activities including anti-submarine warfare. One problem to date has been cost per unit which far exceeds cost for an array of omni-directional hydrophones which may be used for similar applications. A hydrophone array includes multiple hydrophone units to form a synchronized arrangement. These hydrophones may be placed in a variety of different array systems. The arrays may be placed in a number of configurations depending on use, including resting on the seafloor, moored in a vertical line array in the water column, or towed in a horizontal line array behind a boat or ship. Various sounds, e.g., from maritime vessels (ships, submarines), reach each individual hydrophone on the array at slightly different times depending on the direction from which the sound is coming. This time difference, i.e., time-of-arrival-difference, is used to determine direction. Directional hydrophones have a higher sensitivity to signals from a particular direction and may be used for locating and tracking objects.

A specific example of utility for AVS devices would be in the SHDAS (Seismic Hydroacoustic Data Acquisition System) referenced in the following technical reports: Slad, George William, and Merchant, Bion J. SHDAS Production Seismometer Evaluation. United States: N. p., 2017. Web. doi:10.2172/1409159 (Nov. 1, 2017) and Merchant, Bion J. SHDAS Production Digitizer Evaluation. United States: N. p., 2017. Web. doi:10.2172/1373644 (Jul. 1, 2017) which are incorporated herein by reference in their entireties. The existing prior art devices used in SHDAS, generally referred to as Ocean Bottom Seismometers (OBSs), have several limitations that prevent them from performing adequately for the application being considered herein. The prior art OBS is much too large to accommodate packaging and deployment constraints given the large number of elements required in each unit. The large size of the prior art OBS causes mechanical resonances to occur at relatively low frequencies. The usable signal response of a sensor system is unreliable for frequencies greater than typically about one-half of the mechanical resonant frequency. For this reason, the prior art OBS is limited to frequencies less than approximately 40 Hz. The signal frequencies for the application of interest are significantly greater than 40 Hz, making the prior art OBS design inadequate for certain applications.

The prior art OBS uses a mechanical hard-stop to limit axial rotation of the gimbal system. This hard-stop is required to prevent sensitive-element wiring from excessive wrapping around the gimbal. Excessive wrapping prevents the sensitive elements from working properly. There are two problems with the hard stop. The first is that the hard stop prevents the prior art OBS from operating properly for some axial-rotation angles. For the application of interest, it is not possible to limit the unit's installed orientation to accommodate this limitation of the prior art OBS. The second problem is that the gimbal system will sometimes stick to the hard stop when it should be free of the hard stop. When this sticking occurs, the prior art OBS is even more limited in the axial angle span that it can accommodate.

Accordingly, there is a need in the art for an AVS design that overcomes the deficiencies of the prior art OBS.

SUMMARY OF THE CLAIMED EMBODIMENTS

In a first exemplary embodiment described herein, a horizontal acoustic vector sensor system includes: a housing; a gimbal assembly within the housing including a sensor assembly and an outer gimbal, the sensor assembly including multiple pairs of seismometers, wherein each pair of seismometers is arranged orthogonally to one or more neighboring pairs of seismometers, along an approximately horizontal axis; an endcap for enclosing the gimbal assembly within the housing; and at least one omni-directional hydrophone integrated into the endcap on a side of the endcap that is opposite the gimbal assembly.

In a second exemplary embodiment described herein, a horizontal acoustic vector sensor system includes: a dome-shaped housing having a single accessible end; a gimbal mount contained within the dome-shaped housing; a sensor assembly mounted within the gimbal mount, wherein the sensor assembly includes three pairs of seismometers, wherein each pair of seismometers is arranged orthogonally to one or more neighboring pairs of seismometers, along an approximately horizontal axis; an endcap for closing the single accessible end of the dome-shaped housing and enclosing the gimbal mount and sensor assembly within the housing; at least one omni-directional hydrophone integrated into the endcap on a side of the endcap that is opposite the gimbal mount; and an electronics assembly integrated within the endcap, wherein the electronics assembly is physically wired to the sensor assembly via a slip-ring.

BRIEF DESCRIPTION OF THE FIGURES

Example embodiments will become more fully understood from the detailed description given herein below and the accompanying drawings, wherein like elements are represented by like reference characters, which are given by way of illustration only and thus are not limitative of the example embodiments herein.

FIGS. 3a, 3b, 3c, 3d, and 3e illustrate varying views of an end cap of a HLAVS in accordance with one or more embodiments herein;

FIG. 5 illustrates self-noise for a single sensor of a HLAVS in accordance with one or more embodiments herein;

DETAILED DESCRIPTION

Figure 1A:
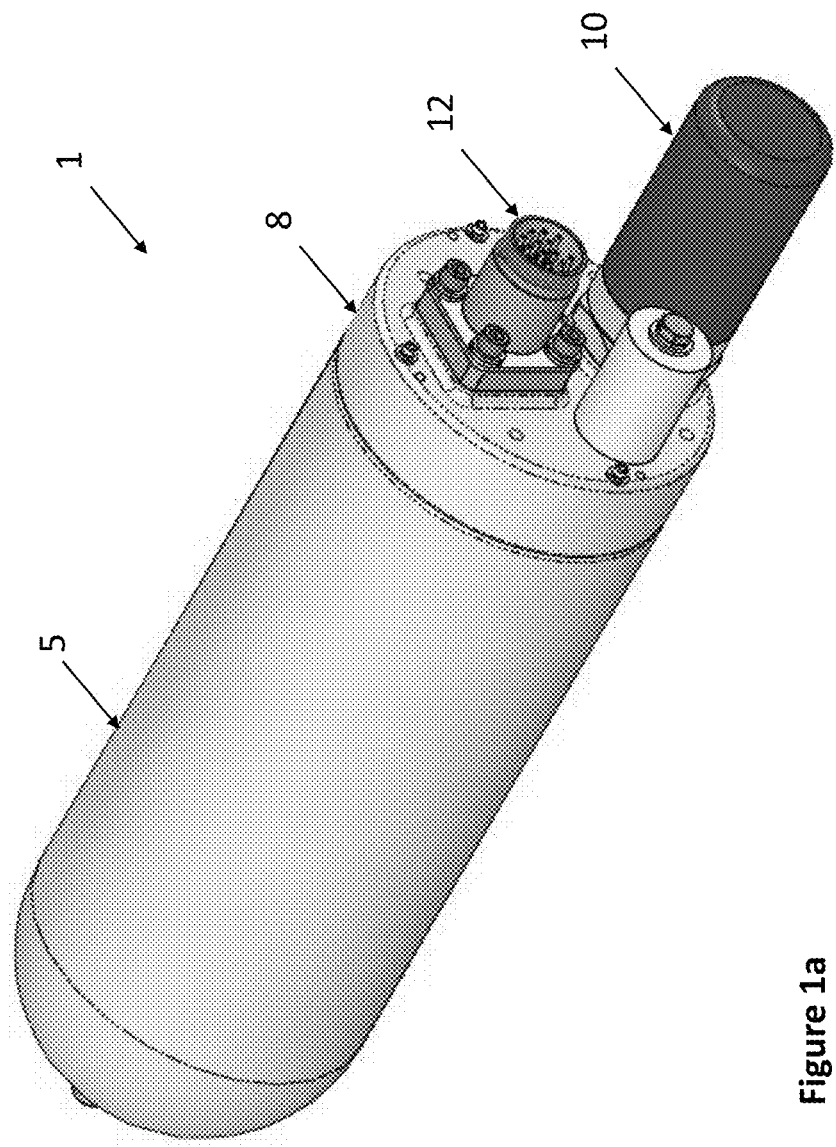
FIGS. 1a, 1b and 1c are various views of an exemplary Horizontal Leidos Acoustic Vector Sensor (HLAVS) in accordance with one or more embodiments herein.
Figure 1B:
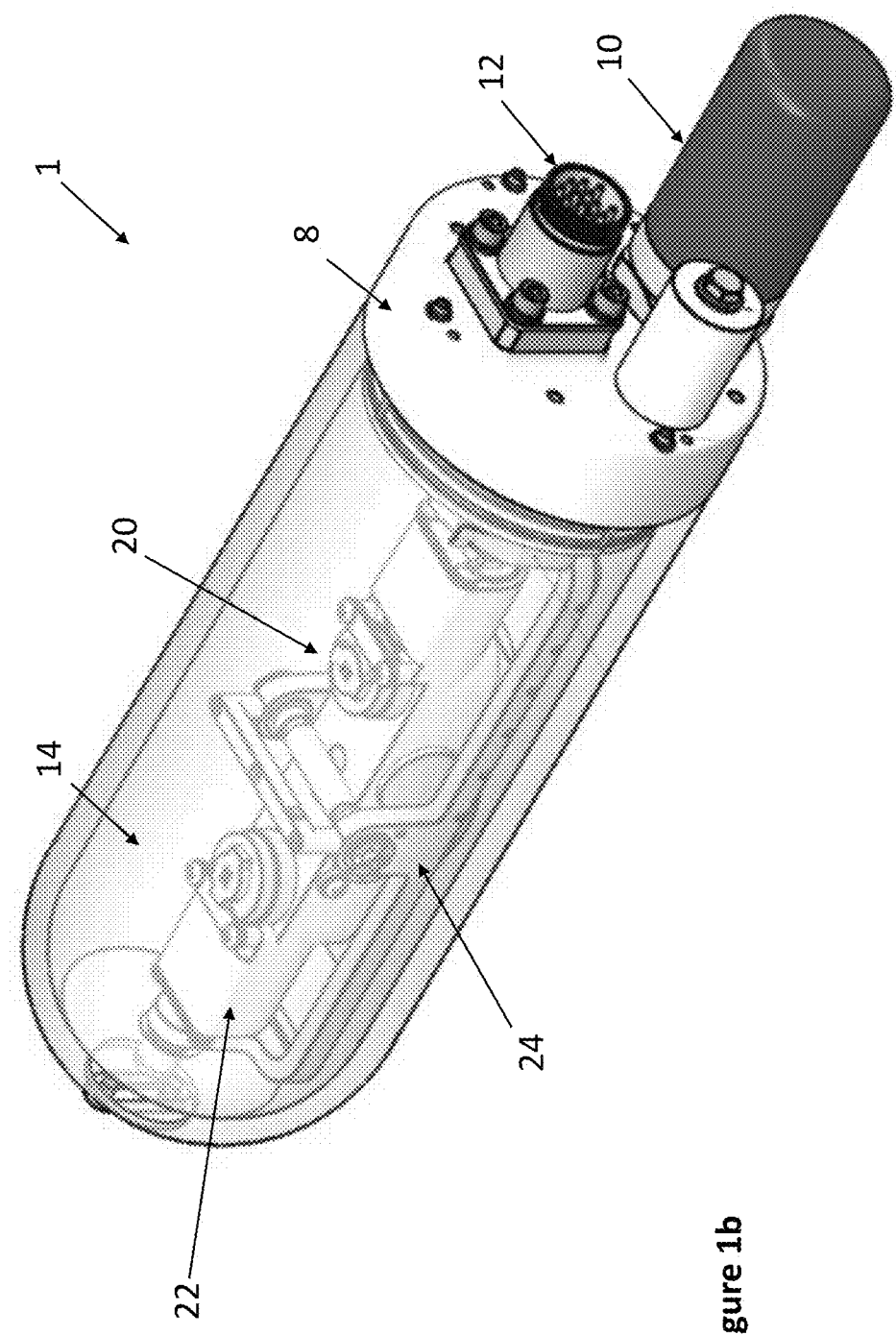
Figure 1C:
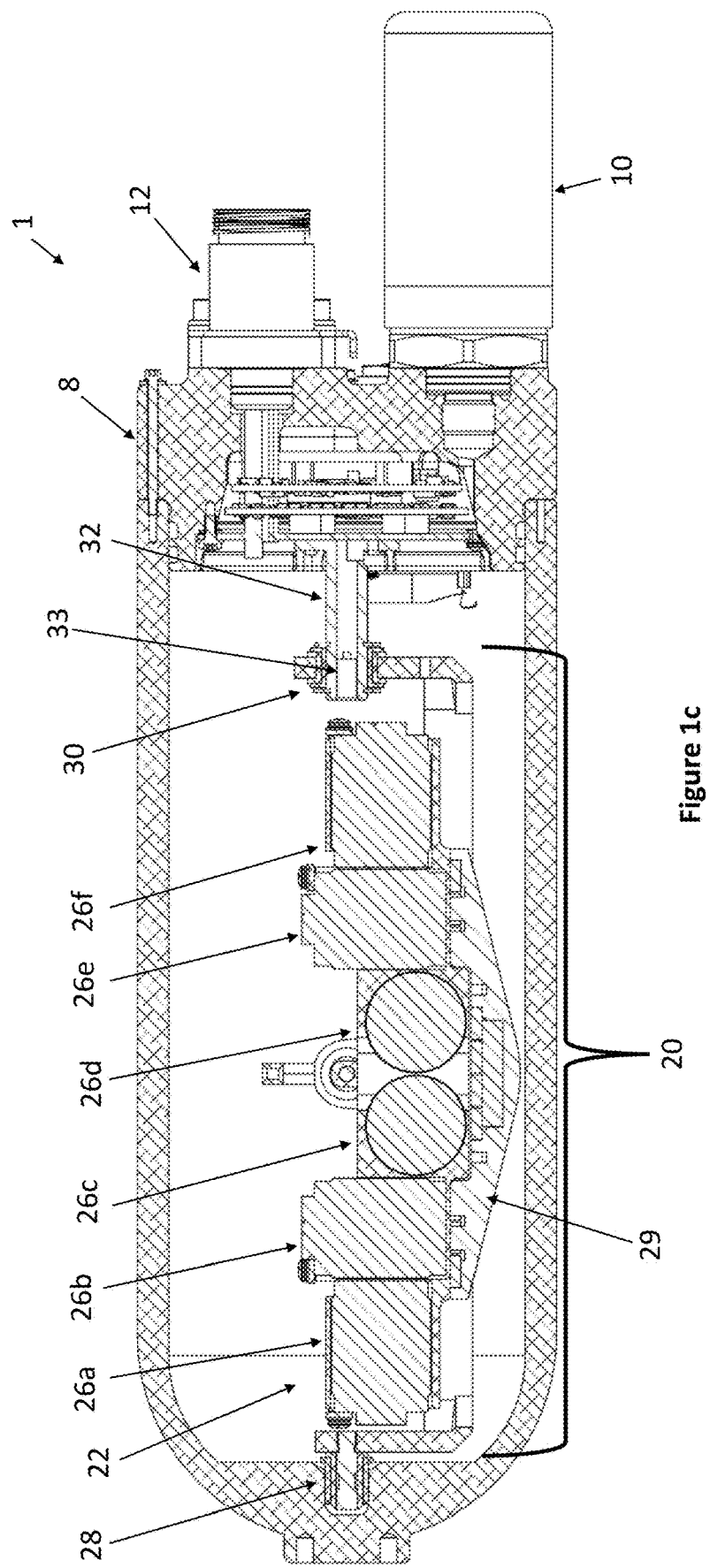

Referring to FIGS. 1a, 1b and 1c, various views of an exemplary Horizontal Leidos Acoustic Vector Sensor (HLAVS) 1 in accordance with one or more embodiments herein is illustrated. FIG. 1a provides an external view of the HLAVS 1 including dome-shaped cover (or housing) 5 formed of an aluminum alloy or comparable material and end cap 8 including omni-directional hydrophone 10 and cable assembly bulkhead 12. FIG. 1b provides and transparent view to the gimbal assembly 20 enclosed within dome-shaped cover 5 and end cap 8 and surrounded by silicone fluid 14. The gimbal assembly 20 includes a sensor assembly 22 and an outer gimbal 24.

FIG. 1c is a cross-sectional view of the HLAVS of FIGS. 1a and 1b, showing additional details of certain internal features. For example, FIG. 1c shows sensor assembly 22 which comprises: six individual seismometers or geophones (hereafter "sensors" or "seismometers" but not so limited) 26a to 26f within a center gimbal 27 wherein pairs of sensors are arranged in an orthogonal, 3-axis configuration to provide high-sensitivity directional performance and a weight retainer 29. The sensor assembly 22 is attached to outer gimbal 24 which is pivotally attached on either end thereof via pivot pin 28 to the dome end of the housing 5 and via pivot pin assembly 30 and shaft 32 to the end cap 8. Slip ring 33 accommodates pivoting of the gimbals and flexibly connects wires between geophones and any on-board processing electronics and transmission assemblies.

Figure 2A:
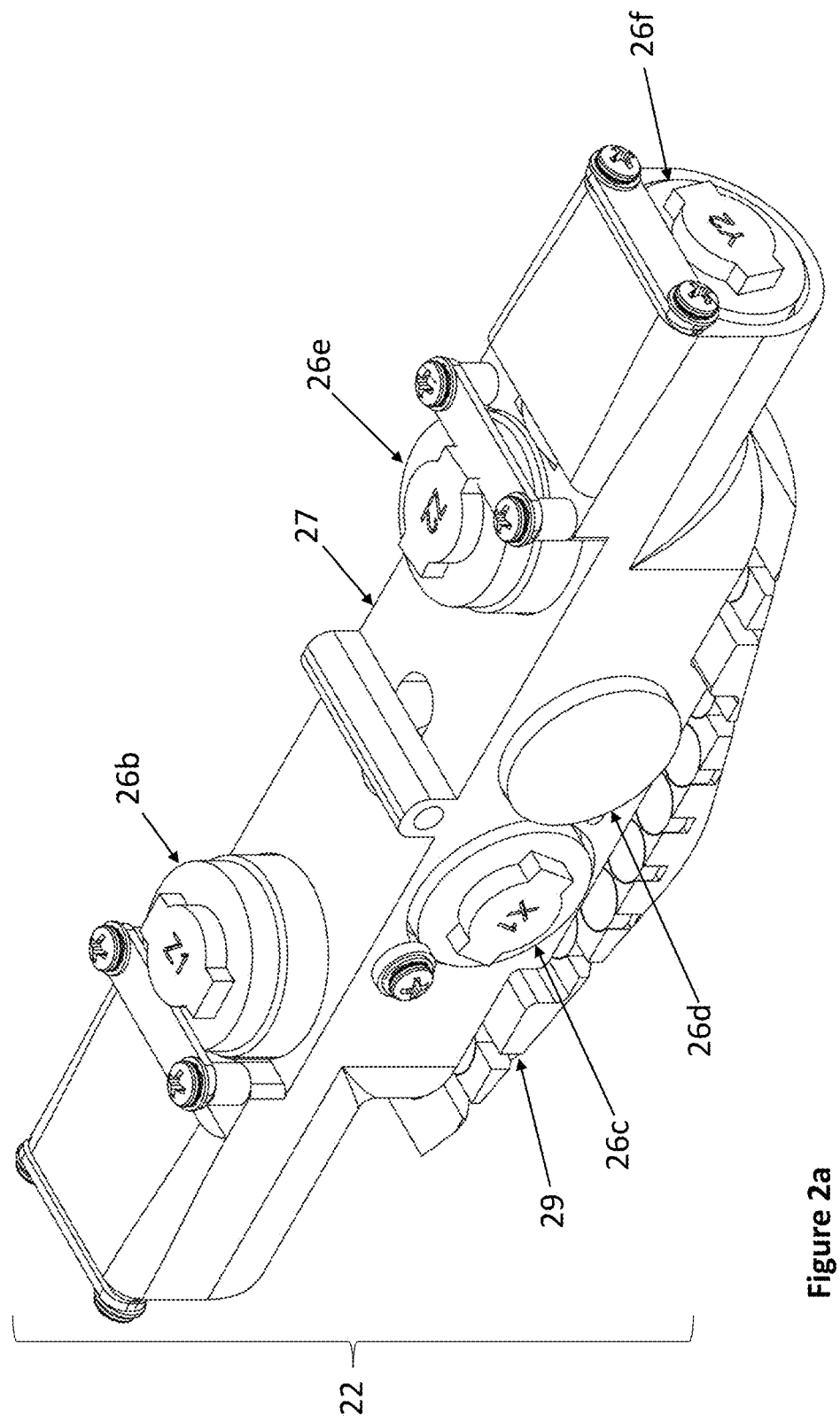
FIGS. 2a, 2b, 2c and 2d illustrate features of a sensor assembly of a HLAVS in accordance with one or more embodiments herein.
Figure 2B:
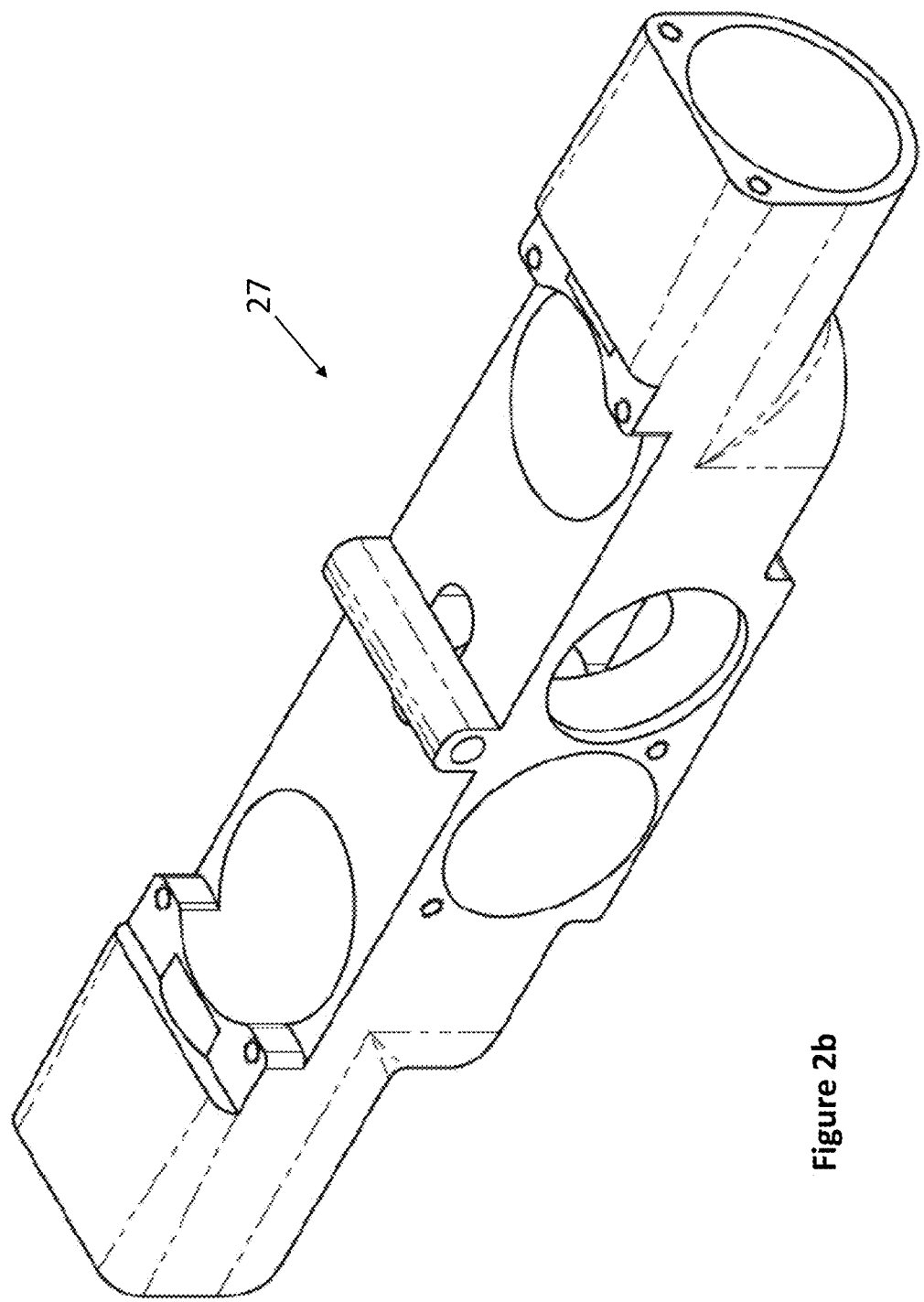
Figure 2D:
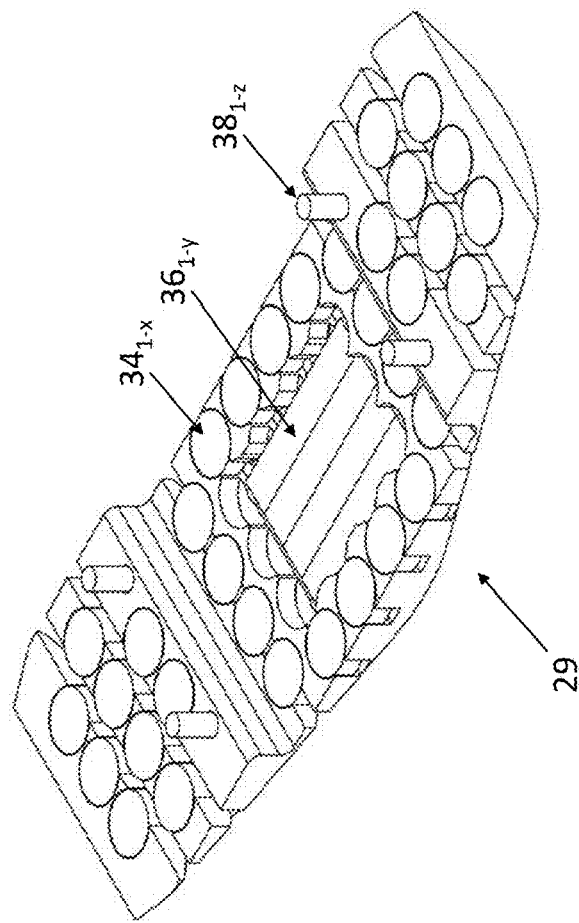
Figure 2C:
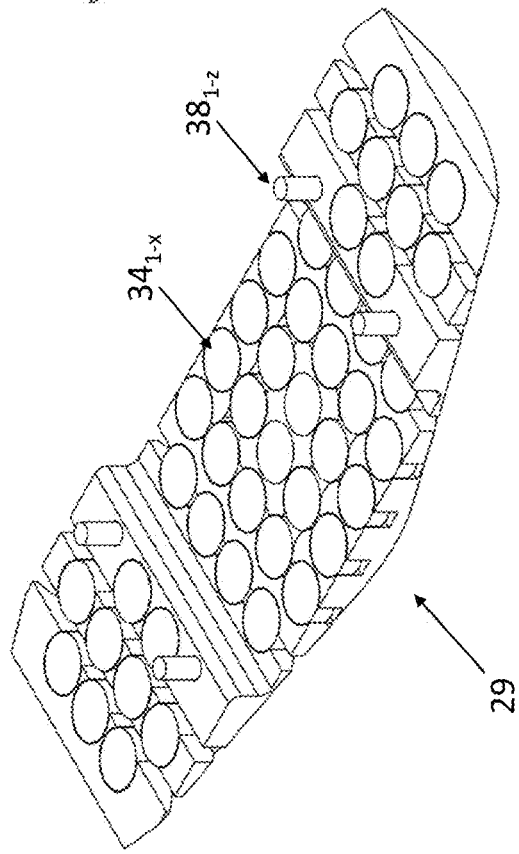
Figure 3E:
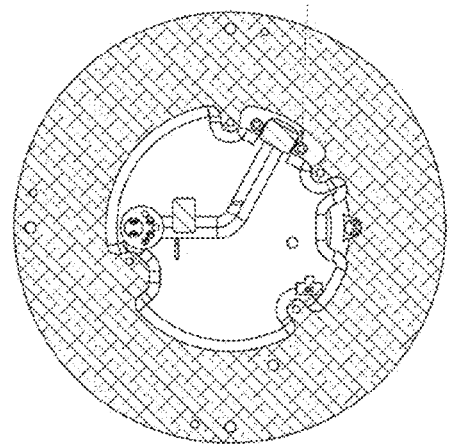
Figure 3D:
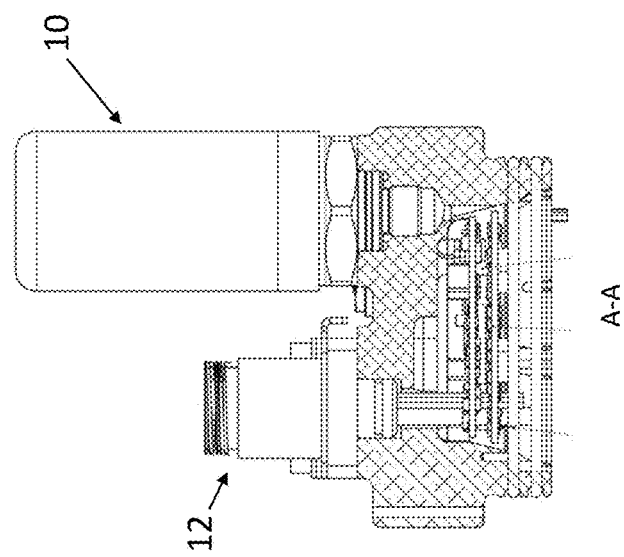
Figure 3C:
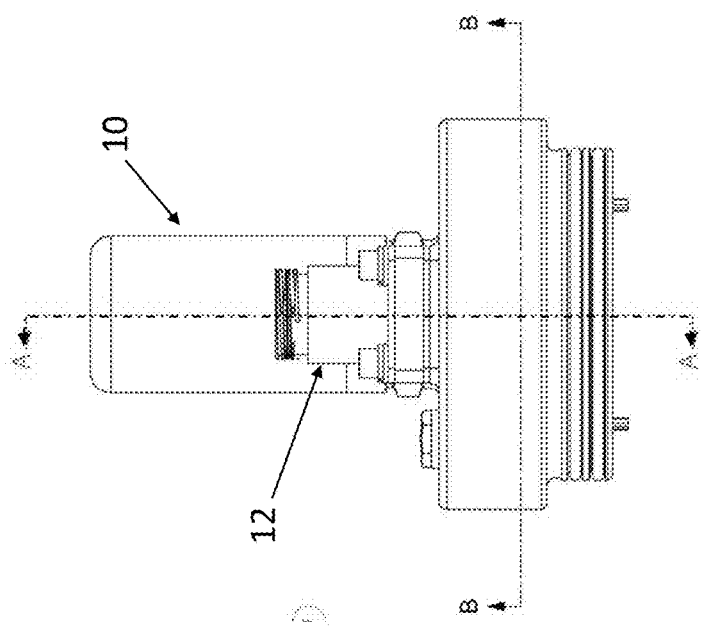

FIGS. 2a, 2b, 2c and 2d illustrate features of the sensor assembly 22, including the weight retainer 29 which includes an arrangement of multiple disc-shaped weights $34_{1-x}$ as well as additional weights $36_{1-y}$ in the center of the weight retainer 29, below an upper layer of disc-shaped weights. The center gimbal 27 (FIG. 2b) is attached to the weight retainer 29 via screws $38_{1-z}$. In the specific illustrated embodiment, x=46, y=4 and z=4, but one skilled in the art will appreciate that variations to the arrangement, type and shape of the weights can vary. FIG. 2a shows five of the six sensors within center gimbal 27: 26b to 26f and the orthogonal sensor pairs symmetry, e.g., 26b, 26e are a pair, 26c, 26d are a pair and 26a (not shown), 26f are a pair.

FIGS. 3a, 3b, 3c, 3d, and 3e illustrate varying views of the end cap 8 including hydrophone 10, pressure release valve 11, and cable assembly bulkhead 12. Additionally, end cap 8 includes various electronics, including first electronics for pre-amplifying the analog signal from the seismometers. A low-noise preamplifier preserves the inherent performance of the seismometers 26a-26f. The output of the preamplifier is typically routed to an A/D (Analog-to-Digital) converter. And electronics for coupling the AVS with the hydrophone digitizes the analog data and packetizes the data. A second set of electronics also contains a 3-axis compass for heading and tilt. Although shown as separate sets of electronics, one skilled in the art recognizes that the components and functionality of the first and second electronics may be combined on a single board.

The electronic system also measures the electrical impedance of the HLAVS geophone sensitive elements with the external mission damping resistor in place. The end goal of this action is to determine calibration (magnitude and phase) and self-noise of the sensitive elements as a function of frequency. This measurement is made by driving an electrical current through the geophone sensitive elements while simultaneously digitizing the voltage across the elements as well as the current through the sensitive elements. The magnitude and phase of the electrical impedance is then quantified by taking the ratio of the voltage and current in the frequency domain. More specifically, the ratio is formed from Fourier transforms of the voltage and current. The frequency span of the measured electrical impedance is 0.1 Hz to 75 Hz in 0.1 Hz steps, although other frequency spans and step sizes can be used. These data are then used to compute the calibration (magnitude and phase) and self-noise of the geophone sensitive elements through a three-step process. The first step is to use an optimizing algorithm (such as steepest descent with a least-squares cost function) to find the constituent parameters that control the frequency-dependent electrical impedance of the moving-coil sensitive element as defined in Equation (1) below, $$Z(f) = \frac{G_g^2 s}{M\left[s^2 + 2\lambda\omega_0 s + \omega_0^2\right]} + R_c \qquad (1)$$

Where
s=Laplace transform variable=$\omega\sqrt{-1}$,
$\omega=2\pi f$,
f=frequency (Hz),
$G_g$=Generator constant with typical units of Volts/(meter/second),
M=mass of moving coil,
$\omega_0$=resonant frequency (radians/sec),
$\lambda$=damping, and
$R_c$=loss resistance.

Because of this, it is important to implement frequency-step sizes sufficiently small to provide negligible interpolation error. For the case of a GS-One sensor, a step size of 0.1 Hz is sufficiently small.

The second step is to use the constituent parameters (Gg, ω0, λ, and $R_c$) from Step 1 to compute the complex calibration (magnitude and phase) as a function of frequency from Equation (2).

$$Sen(f) = \frac{G_g s^2}{s^2 + 2\lambda\omega_0 s + \omega_0^2} \qquad (2)$$

Where
Sen(f)=velocity sensitivity (calibration)
$G_g$=generator constant with typical units Volts/(meter/sec),
f=frequency (Hz),
$s=2\pi f\sqrt{-1}$,
M=mass of moving coil,
$\omega_0$=resonant frequency (radians/sec), and
$\lambda$=damping.

The parameter, $R_c$, is not required in Equation (2). This is due to (a) the HLAVS geophone preamplifier having a virtually infinite input impedance and (b) the electrical impedance of the sensitive elements is measured with the mission shunt external damping resistor in place. The condition (b) causes the estimation algorithm to account for the effect of $R_c$ and the mission shunt damping resistor in the parameters $G_g$ and $\lambda$. A further advantage of this particular implementation is that knowledge of the value of the mission eternal damping resistor is not required to compute sensitivity (calibration). This feature eliminates vulnerability to errors in documenting the damping resistor values.

Figure 4:
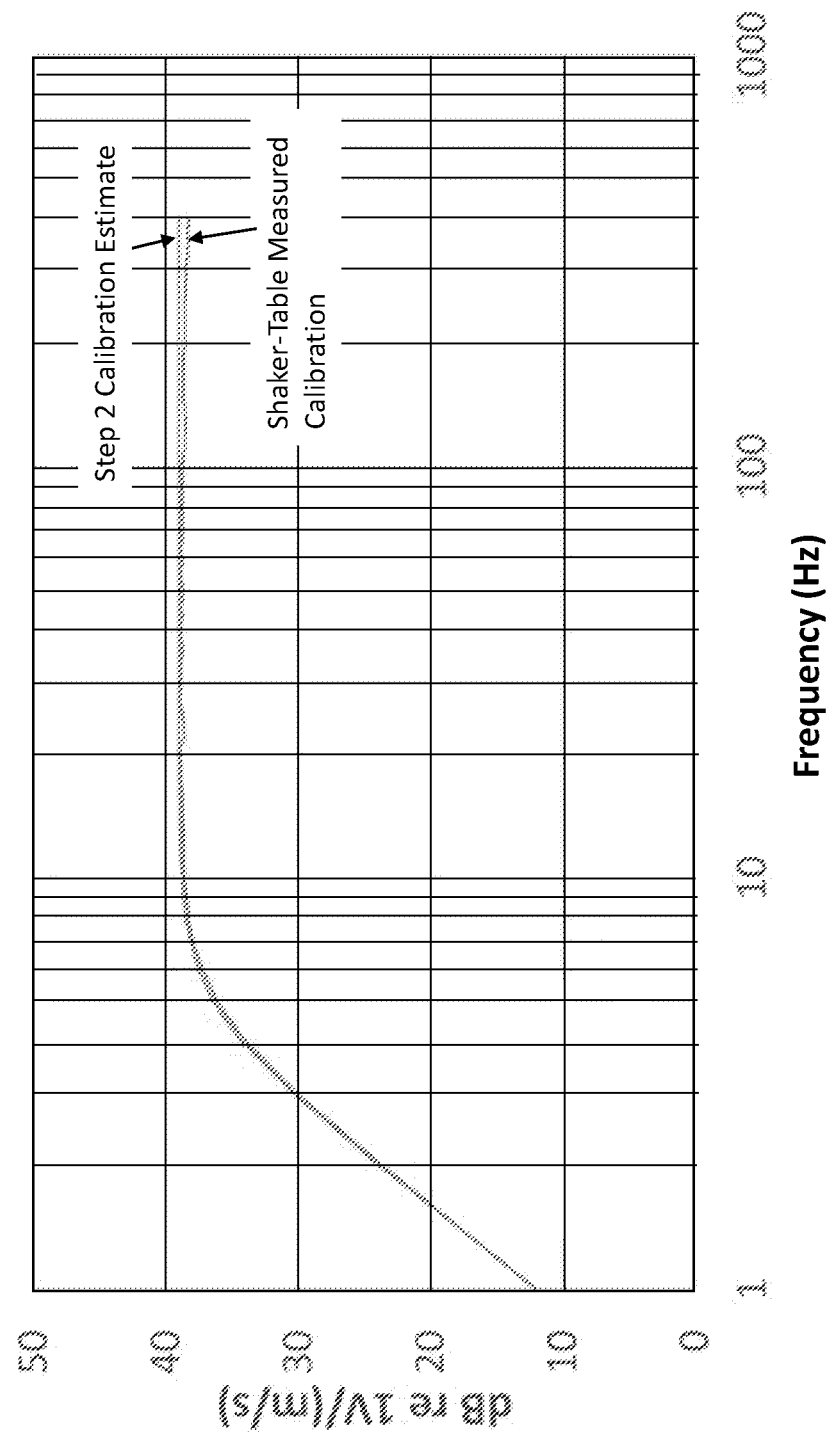
FIG. 4 illustrates typical accuracy of the calibration estimate step by comparing the computed sensitivity from Step 2 with calibration measured with a conventional instrumented shaker table for a single sensor of a HLAVS in accordance with one or more embodiments herein.

FIG. 4 illustrates typical accuracy of the calibration estimate by comparing the computed sensitivity from Step 2 with calibration measured with a conventional instrumented shaker table for a single sensitive element. The graph of FIG. 4 shows the computed sensitivity from Step 2 and the shaker-table measured calibration typically differ by less than 0.3 dB over the frequency span from 1 Hz to 400 Hz. Note: Shaker-table calibration data differ from Step 2 data by 0.7 dB near 400 Hz. This difference is within the tolerance of measurement.

The third step quantifies the spectral self-noise of the sensitive element by using the well know relationship expressed by Equation (3) to compute the frequency-dependent spectral noise (Johnson noise) due to the real part of the electrical impedance.

$$N_O(f)=2\sqrt{R(f)kT\Delta f} \quad (3)$$

where
$\Delta f=1$ Hz
$N_O$=standard deviation of random noise output voltage in 1 Hz of bandwidth
k=Boltzman's constant=$1.38\times 10^{-23}$ Joules/° K.
T=temperature in ° K.

$$R(f) = R_c + \frac{2\lambda\omega_0\omega^2 G_G^2}{M\left[(\omega_0^2 - \omega^2)^2 + (2\omega\lambda\omega_0)^2\right]}, \quad (4)$$

$\omega=2\pi f$,
f=frequency (Hz),
M=mass of moving coil,
$\omega_0$=resonant frequency (radians/sec),
$\lambda$=damping, and
$R_c$=loss resistance.

The frequency-dependent resistance, R(f), defined by Equation (4) is derived by algebraically taking the real part of Equation (1). This parameter can be taken directly from the real part of the measured impedance of the sensitive element. Using Equation (4), however, has the distinct advantage over prior art of being less sensitive to measurement error. These errors are caused by random noise contributions from unavoidable physical motion of the sensor during the time the impedance is measured.

While Equation (4) provides output noise voltage of the sensitive element, it is typically more meaningful to express self-noise of the sensitive elements in terms of equivalent underwater acoustic pressure. The output noise voltage can be mapped to the velocity input by dividing the output noise voltage from Equation (3) by the magnitude of the calibration sensitivity. This magnitude is available by taking the magnitude of Equation (2). The velocity noise can be mapped to an equivalent underwater acoustic spectral noise by accounting for sound speed in water and density of water. More explicitly, the equivalent underwater acoustic self-noise of the sensitive element is given by Equation (5).

The third step quantifies the spectral self-noise of the sensitive element by using the well know relationship expressed by Equation (3) to compute the frequency-dependent spectral noise (Johnson noise) due to the real part of the electrical impedance.

$$N_{acoustic}(f) = \frac{N_O(f)}{|Sen(f)|}\rho c \quad (5)$$

where
$N_{acoustic}$(f)=equivalent underwater acoustic-pressure spectral noise,
$N_O$(f)=output voltage noise from Equation (3),
Sen(f)=velocity sensitivity from Equation (2),
c=sound speed in water, and
$\rho$=density of water.

The HLAVS hardware uses two sensitive elements in electrical series for each of the three directions (x,y,z). The following is a set typical constituent values obtained from Step 2 of the process for the composite sensitive elements.
$G_g$=160.72 Volts/(meter/second)
$\lambda$=0.699
$\omega_0$=61.64 radians/second
$R_c$=3117.2$\Omega$
M=0.028 kg (each of the two sensors has a 0.014 kg mass),
and for seawater
c=1500 meters/second, and
$\rho=1.03\times 10^3$ kg/meter$^3$.

FIG. 5 shows the sensitive element self-noise along with the advertised self-noise as a function of frequency for T=275° K (2° C.). The performance margin allows for the preamplifier contribution of self-noise and some allowance to make the advertised performance a conservative estimate. The sea-state-zero curve is included to show the HLAVS self-noise is significantly lower than sea-state-zero ambient noise over the indicated frequency band.

The HLAVS hardware along with the processing algorithm defined above, quantifies performance of the HLAVS by accurately providing the sensitivity (calibration) and self-noise as a function of frequency. The HLAVS allows this performance measurement to be done even when the system is deployed in the ocean environment. This ability to quantify HLAVS calibration (sensitivity) and self-noise while deployed in its mission environment is an improvement over prior art that depended on laboratory measurements to quantify performance.

Figure 6A:
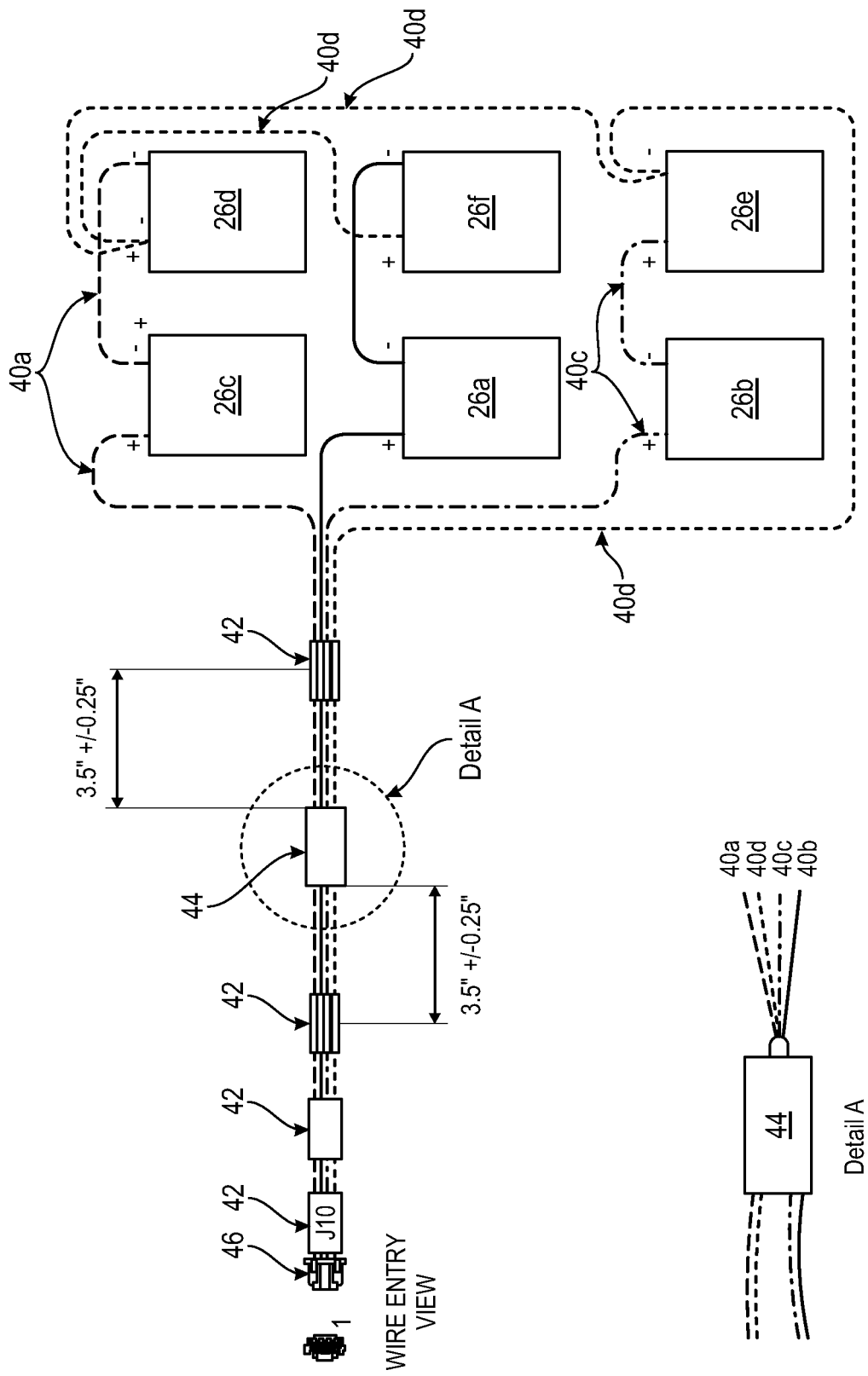
FIGS. 6a and 6b are diagrams showing the physical wiring configuration (FIG. 6a) and related circuitry (FIG. 6b) between the individual seismometers (geophones) 26a-26f and a preamplifier PCB of a HLAVS in accordance with one or more embodiments herein.
Figure 6B:
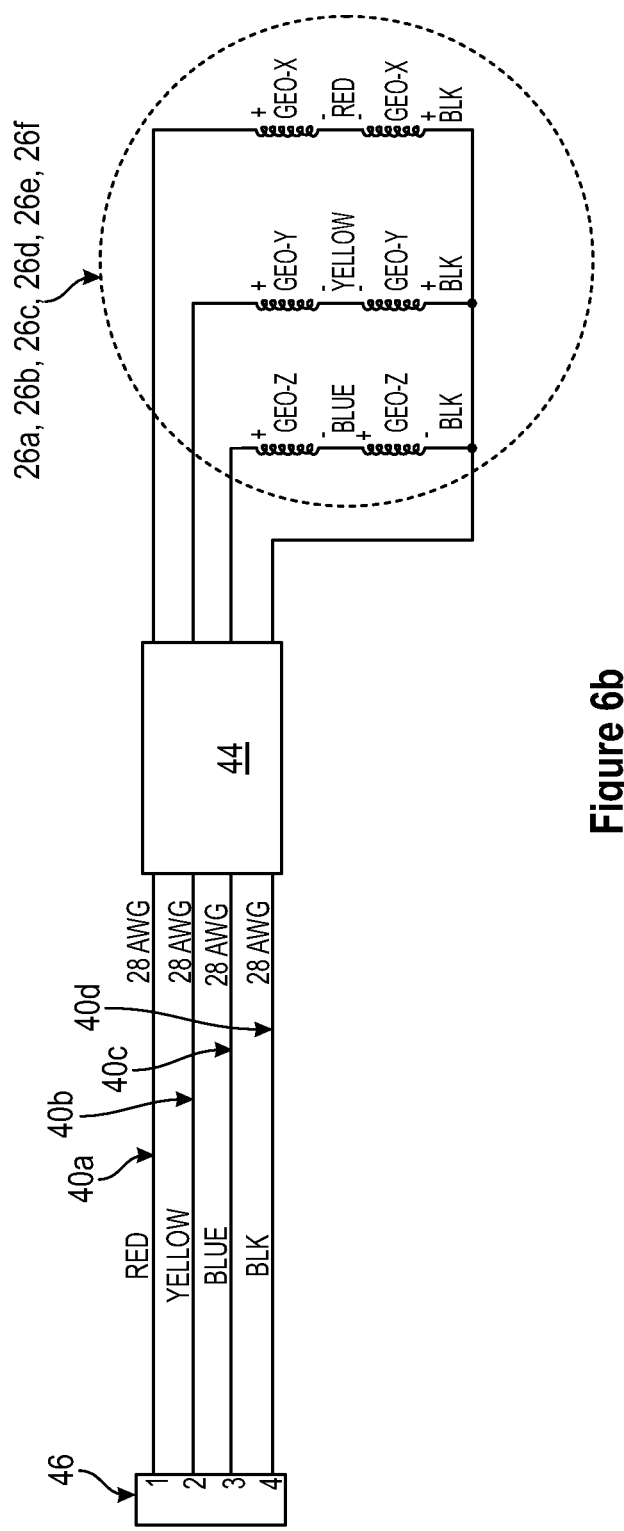

FIGS. 6a and 6b are diagrams showing the physical wiring configuration (FIG. 6a) and related circuitry (FIG. 6b) between the individual seismometers (geophones) 26a-26f and a preamplifier PCB (not shown) and Analog to Digital Converter (ADC) (not shown) located in the end cap 8. The physical wiring configuration includes wires 40a, 40b, 40c, 40d as well as various sleeves 42 for bundling wires, a slip ring 44 and connector 46 for mating with a preamplifier PCB (not shown).

Figure 7A:
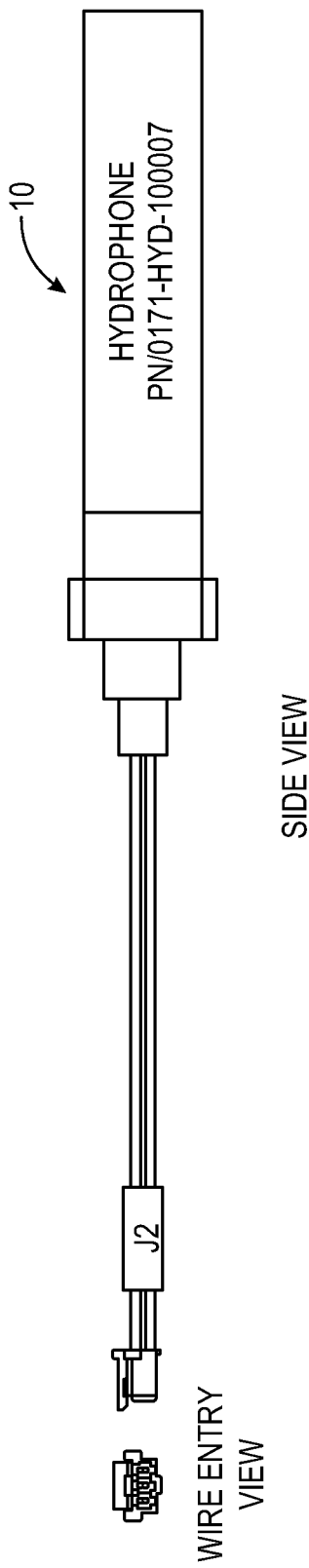
FIGS. 7a and 7b are diagrams showing the physical wiring configuration (FIG. 7a) and related circuitry (FIG. 7b) between the hydrophone and the preamplifier PCB (not shown) of a HLAVS in accordance with one or more embodiments herein.
Figure 7B:
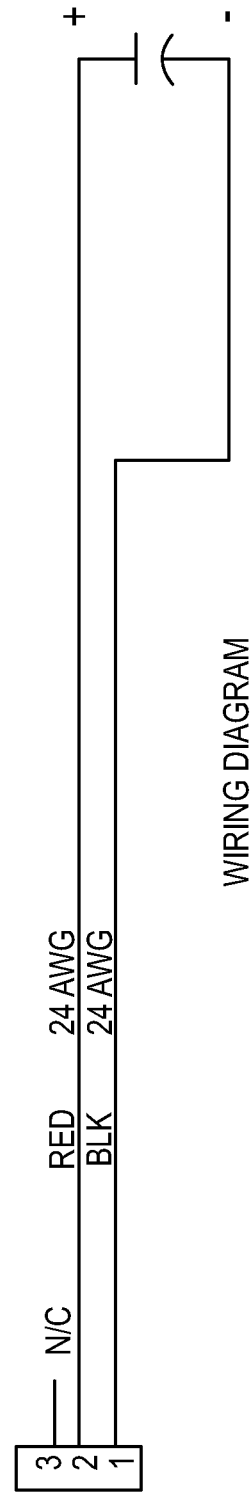

FIGS. 7a and 7b are diagrams showing the physical wiring configuration (FIG. 7a) and related circuitry (FIG. 7b) between the hydrophone 10 and the preamplifier PCB (not shown).

Figure 8A:
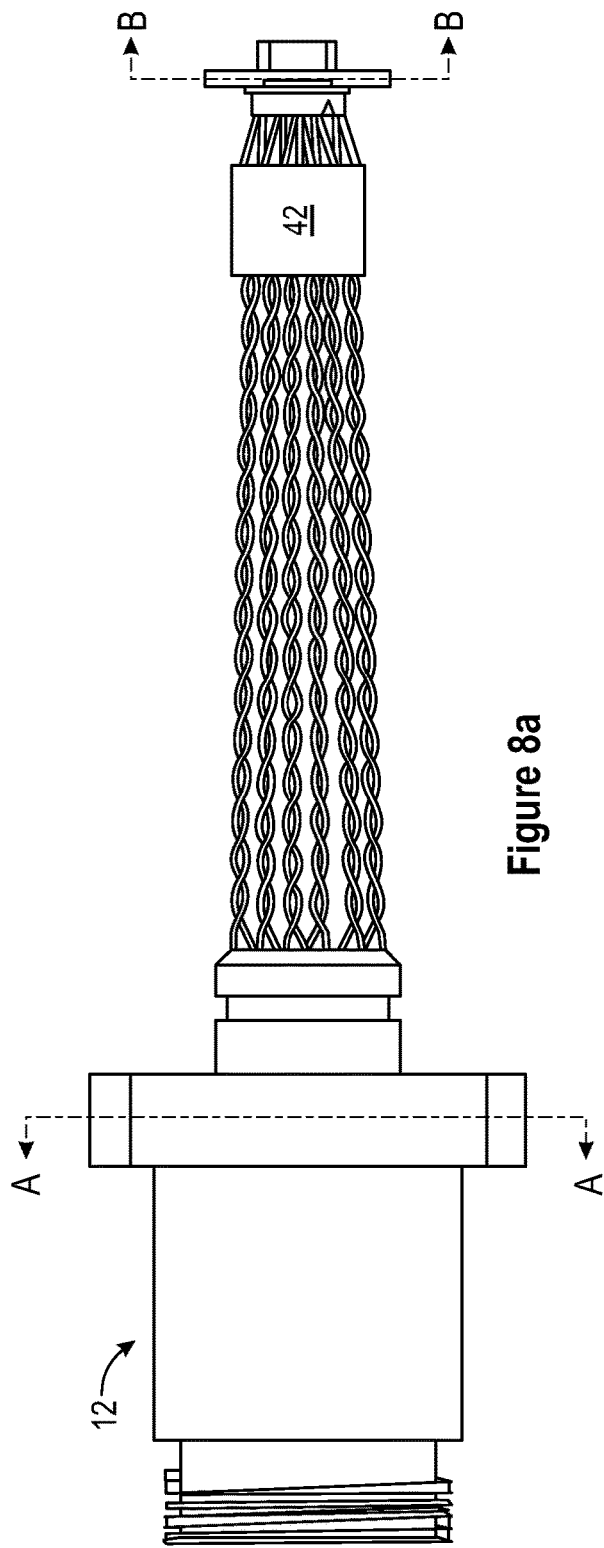
FIGS. 8a, 8b, 8c, 8d show additional details of the cable bulkhead assembly of a HLAVS in accordance with one or more embodiments herein.
Figure 8C:
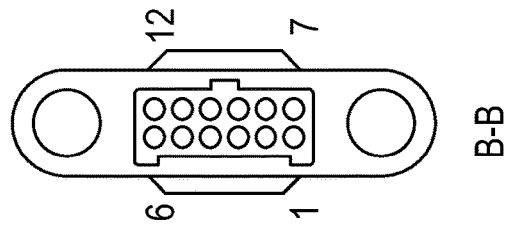
Figure 8B:
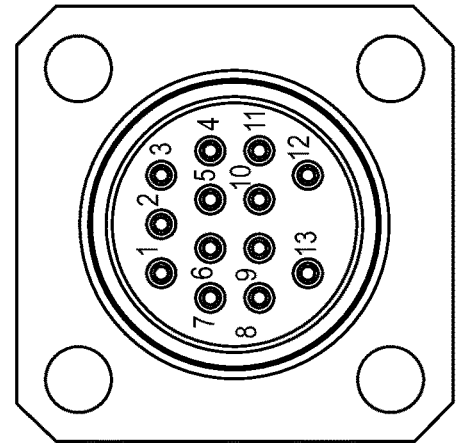
Figure 8D:
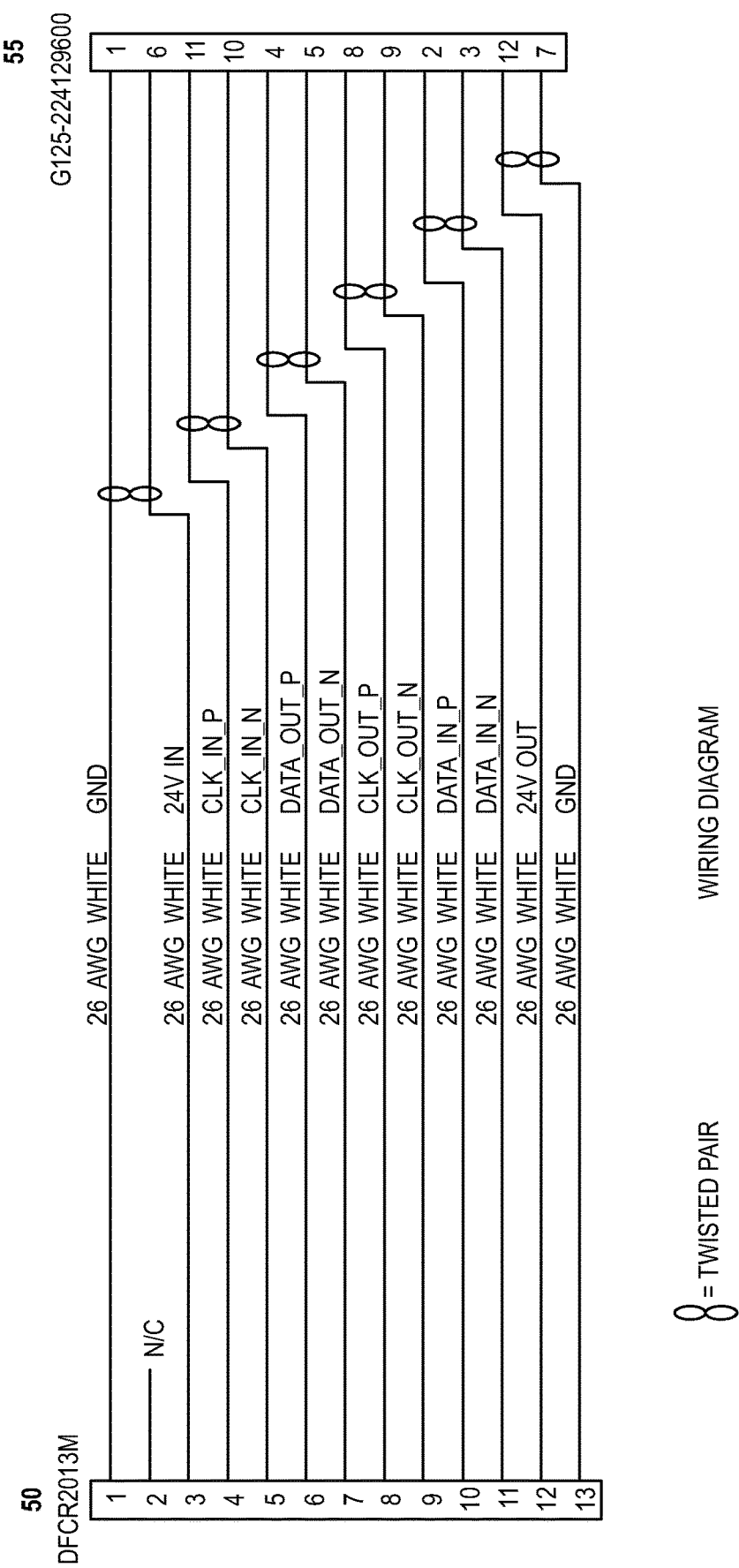

FIGS. 8a, 8b, 8c, 8d show additional details of the cable bulkhead assembly 12. The component at Section A-A (FIG. 8b) is an underwater Ethernet connector 50 supporting transmission of single-pair serial data with Manchester encoding. The component at Section B-B (FIG. 8c) is the connector 55 to the telemetry PCB (not shown). The data flow is time division shared with other HLAVS sensors (FIG. 8d). Processing of transmitted data is done outside the HLAVS as would be understood to one skilled in the art.

The HLAVS device configured in accordance with the specifications described herein overcomes the prior-art problems outlined above. First, the HLAVS reduces the number of sensitive elements by a factor of seven, from 42 in the OBS to 6 in the HLAVS. This reduction, along with mechanical design refinements, allow for a much smaller and more-rigid mechanical structure. The resonant frequencies of this smaller more-rigid mechanical structure are much higher than that of the OBS. Second, the HLAVS uses fluid damping to further mitigate risk of mechanical resonances degrading the signal response. As a result, the HLAVS can accommodate signal frequencies several times higher than that of the prior-art OBS.

Further, the HLAVS uses electrical slip-rings to route signals from the sensitive-elements to the amplifier electronics. The slip rings eliminate the need for the mechanical hard-stop of the OBS. In doing so, the limited axial rotation and sticking problems of the OBS are eliminated.

Further still, the smaller size allows the HLAVS to accommodate critical mission deployment constraints that the prior art cannot accommodate. The reduced size of the mechanical suspension components along with the addition of damping fluid allows the HLAVS to accommodate signal frequencies several times greater than possible with the prior art. The addition of slip rings allows the HLAVS design to accommodate deployment scenarios that cannot be accommodated by the prior art. The prior-art design is limited to less than one full turn of net axial rotation during deployment. If the net axial rotation exceeds one turn, the deployed unit may not be operational. In contrast, the HLAVS design can accommodate an unlimited number of net turns during installation. This feature is paramount for the intended application. The slip rings and damping fluid also eliminate a frictional sticking problem associated with the prior art.

One skilled in the art recognizes that the AVS embodiments described herein may be used in numerous applications including, but not limited to: Anti-Submarine Warfare; Ocean Noise Measurement; Marine Mammal Monitoring; Ocean Observation; Environmental Monitoring; Offshore Energy Operations; Marine Renewable Energy; Tidal Energy; Wave Energy; Offshore; Wind Farms; Ocean Observatories; Earthquake & Tsunami Monitoring; Subsea Volcano Detection; ROV's & AUV's; Harbor Security; Pipeline Leak Detection; Fisheries Research; and Arctic Ice Monitoring.

The exemplary embodiments described herein are not intended to be limiting. Certain variations to one or more aspects will be readily recognized by those skilled in the art and are intended to be considered as being within the scope of the embodiments.

The invention claimed is:

1. A horizontal acoustic vector sensor system comprising:
a housing;
a gimbal assembly within the housing including a sensor assembly and an outer gimbal, the sensor assembly including multiple pairs of seismometers, wherein each pair of seismometers is arranged orthogonally to one or more neighboring pairs of seismometers, along an approximately horizontal axis;
an endcap for enclosing the gimbal assembly within the housing; and
at least one omni-directional hydrophone integrated into the endcap on a side of the endcap that is opposite the gimbal assembly.

2. The horizontal acoustic vector sensor system of claim 1, wherein the endcap includes an electronics assembly.

3. The horizontal acoustic vector sensor system of claim 2, wherein each pair of seismometers is connected to a pre-amplifier of the electronics assembly by individual wires which first pass through a slip ring before connecting to a pre-amplifier printed circuit board.

4. The horizontal vector sensor system of claim 1, wherein there are three pairs of seismometers.

5. The horizontal acoustic vector sensor system of claim 1, wherein the sensor assembly further includes a weight retainer.

6. The horizontal acoustic vector sensor system of claim 5, wherein the weight retainer is comprised of a pattern of weighted discs.

7. The horizontal acoustic vector sensor system of claim 1, wherein when the gimbal assembly is enclosed within the housing, the housing is filled with a fluid.

8. The horizontal acoustic vector sensor system of claim 1, wherein the fluid is Polydimethylsiloxane (PDMS) Silicone.

9. The horizontal acoustic vector sensor system of claim 1, wherein the endcap further includes an underwater Ethernet connector.

10. The horizontal acoustic vector sensor system of claim 1, wherein the endcap further includes a telemetry printed circuit board.

11. A horizontal acoustic vector sensor system comprising:
a dome-shaped housing having a single accessible end;
a gimbal mount contained within the dome-shaped housing;
a sensor assembly mounted within the gimbal mount, wherein the sensor assembly includes three pairs of seismometers, wherein each pair of seismometers is arranged orthogonally to one or more neighboring pairs of seismometers, along an approximately horizontal axis;
an endcap for closing the single accessible end of the dome-shaped housing and enclosing the gimbal mount and sensor assembly within the housing;
at least one omni-directional hydrophone integrated into the endcap on a side of the endcap that is opposite the gimbal mount; and
an electronics assembly integrated within the endcap, wherein the electronics assembly is physically wired to the sensor assembly via a slip-ring.

12. The horizontal acoustic vector sensor system of claim 11, wherein the gimbal mount includes an inner gimbal and an outer gimbal and the sensor assembly is directly mounted to the inner gimbal.

13. The horizontal acoustic vector sensor system of claim 11, wherein each pair of seismometers is connected to a pre-amplifier of the electronics assembly by individual wires which first pass through the slip ring before connecting to a pre-amplifier printed circuit board.

14. The horizontal acoustic vector sensor system of claim 11, wherein the sensor assembly further includes a weight retainer.

15. The horizontal acoustic vector sensor system of claim 14, wherein the weight retainer is comprised of a pattern of weighted discs.

16. The horizontal acoustic vector sensor system of claim 11, wherein when the gimbal assembly with mounted sensor assembly is enclosed within the dome-shaped housing, the dome-shaped housing is filled with a fluid.

17. The horizontal acoustic vector sensor system of claim 16, wherein the fluid is Polydimethylsiloxane (PDMS) Silicone.

18. The horizontal acoustic vector sensor system of claim 11, wherein the endcap further includes an underwater Ethernet connector.

19. The horizontal acoustic vector sensor system of claim 11, wherein the endcap further includes a telemetry printed circuit board.

* * * * *